United States Patent [19]
Mesnel

[11] Patent Number: 5,628,150
[45] Date of Patent: May 13, 1997

[54] GLASS RUN CHANNEL WITH A COMPOSITE REINFORCEMENT

[75] Inventor: Gerard Mesnel, Dearborn, Mich.

[73] Assignee: The Standard Products Company, Cleveland, Ohio

[21] Appl. No.: 622,105

[22] Filed: Mar. 26, 1996

[51] Int. Cl.$^6$ ...................................................... E06B 7/16
[52] U.S. Cl. ............................. 49/440; 49/441; 49/490.1
[58] Field of Search ............................ 49/440, 441, 502, 49/490.1

[56] References Cited

U.S. PATENT DOCUMENTS

| | | | |
|---|---|---|---|
| 4,783,931 | 11/1988 | Kirkwood | 49/441 |
| 5,010,689 | 4/1991 | Vaughan . | |
| 5,014,464 | 5/1991 | Dupuy et al. | 49/440 |
| 5,217,786 | 6/1993 | Keys . | |
| 5,221,564 | 6/1993 | Keys . | |
| 5,398,451 | 3/1995 | Mesnel . | |
| 5,411,785 | 5/1995 | Cook . | |
| 5,475,947 | 12/1995 | Dupuy | 49/440 X |

FOREIGN PATENT DOCUMENTS

0502587B1  7/1995  European Pat. Off. .

*Primary Examiner*—Philip C. Kannan
*Attorney, Agent, or Firm*—Harness, Dickey & Pierce, P.L.C.

[57] ABSTRACT

A glass run channel for a translationally movable vehicle window. The glass run channel has an elastomeric extrusion having a U-shaped cross section portion defined by two legs joined by a base web. A reinforcement includes a metal core in one of said legs and the base and a thermoplastic polymer structural member for structurally supporting the other leg. In a preferred embodiment, additional structural support for the other leg is provided by a thermoplastic polymeric angle bracket joined to the web and other leg.

7 Claims, 2 Drawing Sheets

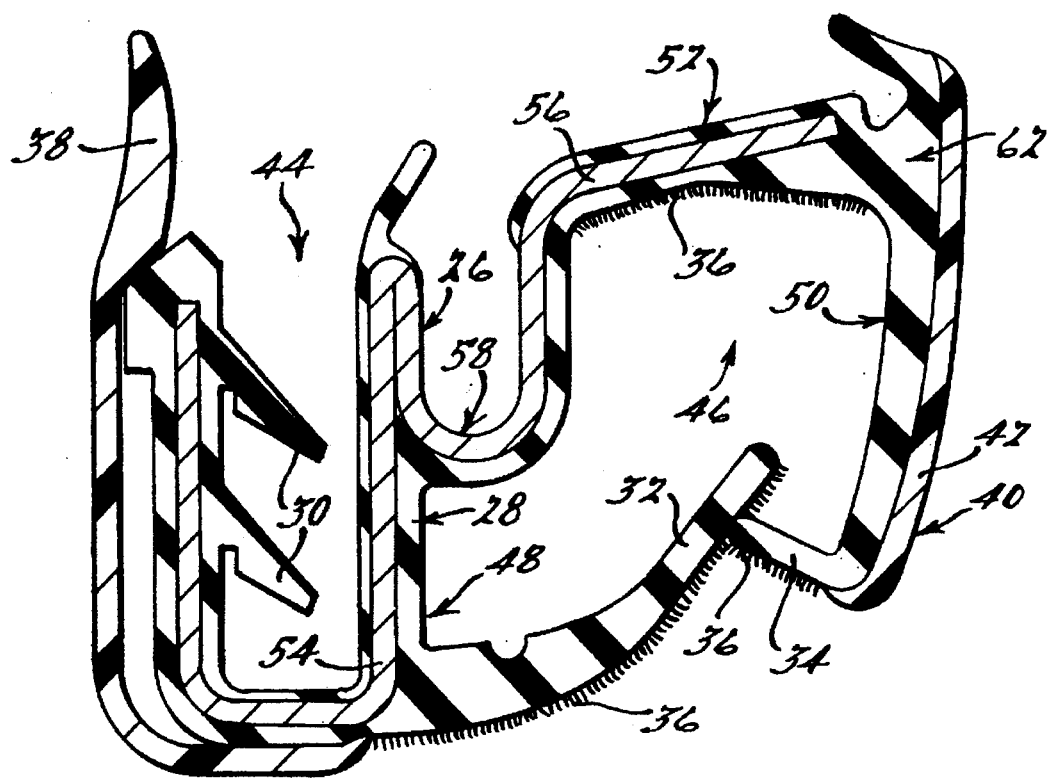
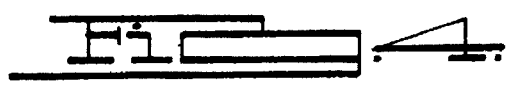
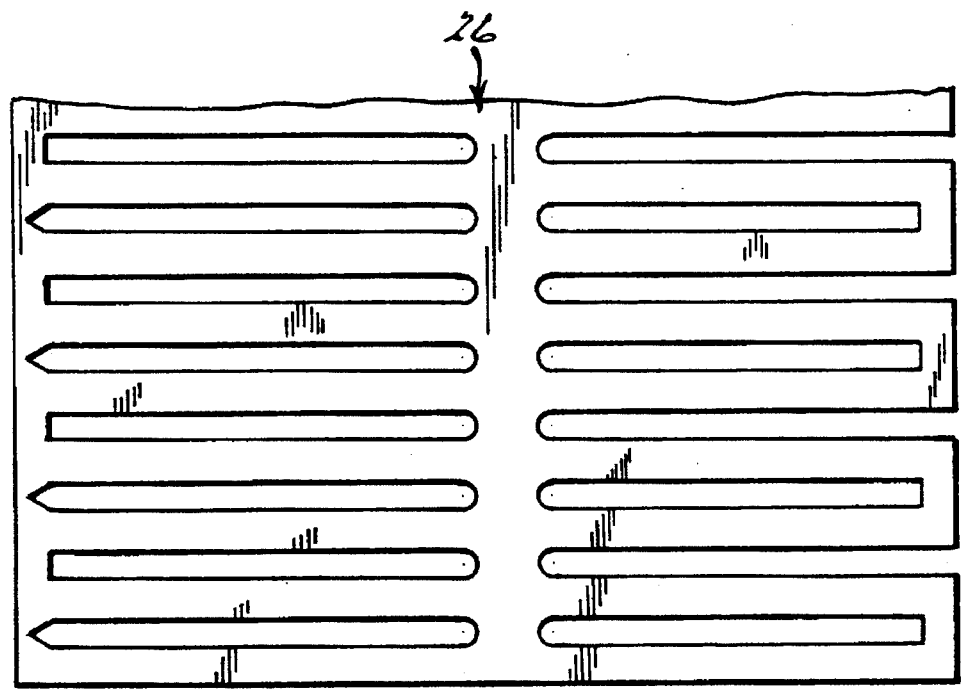
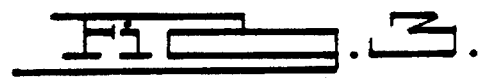

GLASS RUN CHANNEL WITH A COMPOSITE REINFORCEMENT

BACKGROUND OF THE INVENTION

The present invention relates to glass run channel for automotive vehicles. More particularly, the present invention relates to a glass run channel having a composite reinforcement of metal and thermoplastic polymer.

Vehicle glass run channels are used in automotive vehicles and the like to support a window pane while allowing the window pane to move between an open and a closed position. The glass run channel guides and supports the window pane during and after translational movement and forms a seal between the window pane and the vehicle door or body structure. Thus, glass run channel prevents weather elements from entering the passenger compartment, holds the window pane in position to prevent significant movement other than in an intended translational direction and yet allows window pane translational movement without undue resistance.

Automotive window openings often have a shape which poses a challenge to the design and manufacture of a glass run channel. Generally, the challenge is to provide a glass run channel which can be easily installed during manufacture of the vehicle to extend along the sides and top of the window opening while also meeting the support and guiding requirements described above. In recent years, a popular glass run channel design has a metallic core with a generally S-shaped cross section which is covered by suitable elastomeric material. The S-shape serves two functions by providing one channel facing in a first direction for clamping attachment to a door flange for retention of the channel thereon and another channel facing in a second direction for guiding and supporting a glass pane. Although an S-shaped metallic core well serves the aforementioned two functions, the S-shape is so stiff that it is difficult to bend to follow the curvature along the header of the window opening. The present invention offers an improvement in this regard.

Thus, this invention provides a glass run channel which can be readily bent to conform to the curve of the header of a window aperture of an automotive vehicle. The glass run channel of this invention can also provide vertical lengths as it is strong like a conventional glass run with a full metal core and has sufficient structural strength allowing the glass run channel to properly retain the window pane and allow for smooth translational operation. Further, the present invention provides a glass run channel which allows for aesthetic improvements in color selection and improved fit to the vehicle surface surrounding the window aperture.

Further understanding of the invention will be had from the accompanying drawings and following specification.

SUMMARY OF THE INVENTION

The present invention provides a glass run channel for a translationally movable vehicle window. The glass run channel has an elastomeric extrusion having a U-shaped cross section portion defined by two legs joined by a base web. A metal reinforcement provides structural support for one of said legs and the base. A thermoplastic polymeric structural member provides structural support for the other leg. In a preferred embodiment, additional structural support for the other leg is provided by a thermoplastic polymeric angle bracket joined to the web and other leg.

BRIEF DESCRIPTION OF THE DRAWINGS

FIG. 3 is a plan view of the metallic core used to make the preferred embodiment of FIGS. 1 and 2; and FIG. 4 is a sectional view taken along line 4—4 of FIG. 1 but showing the glass run channel as extruded.

DESCRIPTION OF THE PREFERRED EMBODIMENTS

Figure 1:
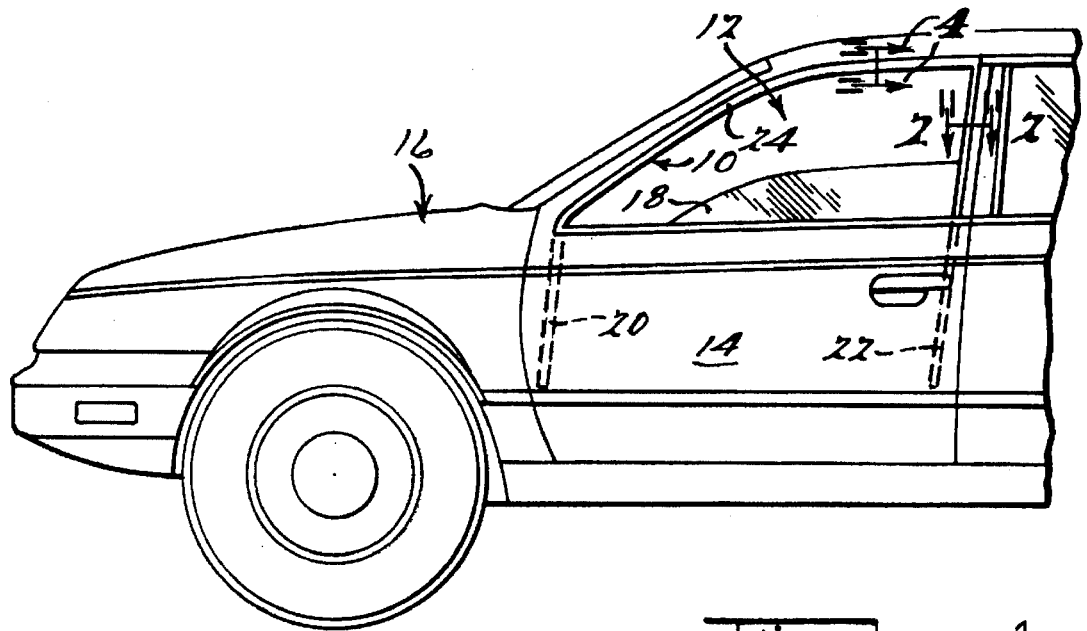
FIG. 1 is a partial elevational view of an automatic vehicle having a preferred embodiment of a glass run channel of the present invention.

Referring now to FIG. 1 of the drawings, there is shown a preferred embodiment of a glass run channel of the present invention indicated generally by the numeral 10. Glass run channel 10 is installed in window aperture 12 of door 14 of automatic vehicle 16 and is shown in operative association with window pane 18 which is vertically translational between open and closed positions as is conventional in modern automotive vehicles. Glass run channel 10 is a continuous elongated assembly with vertically extending lengths 20 and 22 and generally horizontally extending header 24. Vertically extending lengths 20 and 22 of glass run channel 10 extend within door 14 to support window pane 18 when pane 18 is in an open position. Lengths 20 and 22 are joined to header 24 by mitering and molding ends together as is conventional in the art.

Figure 2:
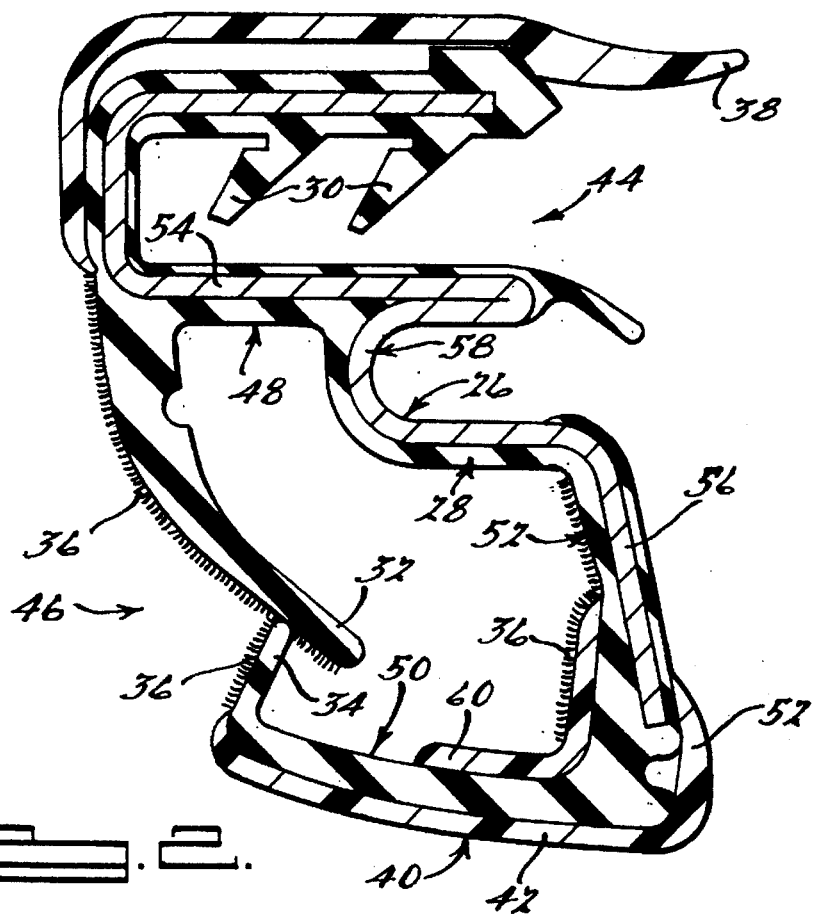
FIG. 2 is a sectional view taken along line 2—2 of FIG. 1 but showing the glass run channel as extruded.

As best shown in FIG. 2, a sectional view of vertical length 22 taken along line 2—2 in FIG. 1, glass run channel 10 includes an elongated metal structural core member 26, comprised of aluminum, steel, or other suitable metal, extending substantially the full longitudinal length of channel 10, it being appreciated that miter cuts of core 26 are made when vertical lengths 20 and 22 are jointed to header 24. An elastomeric extrudate 28, e.g. EPDM, covers substantially all of core member 26. Integrally incorporated within extrudate 28 are retention members 30 and glass guiding and sealing members 32 and 34, respectively. Flocking 36 or other slip coating can be provided on members 32 and 34 and within channel 46 of header 24 as is usual in the art. The flocking 36 or other friction reducing material allows window pane 18 to translate between open and closed positions in a smooth continuous fashion and reduces the effort required to move window pane 18 by either a passenger, in manual applications, or a drive motor, in power applications. Further included in glass run channel 10 is an interior sealing lip 38, providing sealing and transition to the interior surface of door 14.

Metal core member 26 is part of a composite reinforcement 40 of glass run channel 10. The other part of the composite reinforcement 40 includes thermoplastic polymeric member 42. Member 42 is bonded to a generally exterior facing surface of extrudate 28. The terms "interior" or "inward" and "exterior" or "outward" as used herein are with reference to the interior and exterior of vehicle 16.

It will be readily appreciated by those skilled in the art that the preferred embodiment of the present invention shown in cross-section in FIG. 2 has, generally speaking, the popular S-shaped cross section which provides a first channel 44 for clamping retention of glass run channel 10 onto a flange (not shown) of door 14 and a second channel 46 for sliding support of window pane 18. Channel 46, providing the glass run, is generally defined, as viewed in cross-section, by interior leg 48 and exterior leg 50 joined by base 52.

Core member 26 has a generally U-shaped portion defining channel 44 as is conventional for S-shaped glass run. FIG. 3 shows core member 26 in flat form before core member 26 is roll formed into final form. As shown in FIG.

3, core member 26 is an elongated metallic member of generally uniform thickness having material removed, by stamping or any suitable process, in a pattern allowing the core member to conform to a pinch weld flange of window aperture 12 after secondary forming operations have been performed. Core member 26 can have a broad range of conventional patterns. Generally speaking, core 26 will be made of aluminum or steel. In accordance with the present invention, core member 26 extends only within leg 48 and base 52 of channel 46. Thus, leg 54 of core 26 extends within leg 48 of channel 46 and base web 56 of core 26 extends within base 52 of channel 46. A curved formation 58 adds further structural integrity metal core 26 and also acts as a stop surface for guiding member 32, such that window pane 18 is positively directed toward seal member 34 thereby providing an interference fit and seal therebetween.

As opposed to conventional S-shaped glass run channels in which the structural core is commonly an S-shape, formed by two U-shaped portions inverted with respect to one another, the present invention employs a composite reinforcement structure which combines the structural integrity of metal core 26 with thermoplastic polymeric structural member 40. Member 40 comprises a member 42 generally L-shaped in cross-section and bonded as by co-extrusion or adhesive to the exterior surface of elastomeric material of leg 50. An additional thermoplastic polymeric structural member, angle bracket 60 is provided for still additional structural support of vertical lengths 20 and 22 of glass run channel 10. Channel 46 thus has an outer leg 50 provided with sufficient structural integrity to provide a proper seal between window pane 18 and seal member 34, and further to retain window pane 18 within channel 46 of glass run channel 10 when an outwardly directed force is applied to window pane 18 or a significant pressure increase is experienced within vehicle 16, for example, when a vehicle door or deck lid is rapidly closed.

Elastomeric extrusion 32 comprises a conventional elastomeric material such as EPDM rubber. Polymeric structural members 42 and 60 are made of thermoplastic polymeric material which can be melt bonded or otherwise bonded as by adhesive to the EPDM or other rubber. A preferred thermoplastic polymeric material is a polyethylene. In a preferred embodiment, the thermoplastic polymeric material is extrudable onto the rubber. After extrusion and while the thermoplastic polymer is in a plastic state, the glass run channel 10 can be readily bent and/or swept in multiple directions and/or spirally twisted along or about its longitudinal axis to a desired curvature or attitude to fit, for example, along the curved header portion of a window opening. Upon cooling, the thermoplastic will become rigid to hold the bend or curvature of glass run channel 10. Preferably, the member 42 is made of a material which is color matched to a vehicle surface. The structural integrity of channel 46 is enhanced in the present embodiment by an inwardly projecting leg 52 of member 42 which is generally parallel to and partially overlaps with web 56 of metal core 26. The elastomeric material at 62 between leg 50 and base 52 of channel 46 allows for limited flex therebetween and allows some bending of header 24 of channel 10. Depending upon the durometer of elastomeric extrusion 28 and the amount of resistance to deflection required between seal member 34 and window pane 18 in a particular application, polymeric structural member 40 may be alternately configured to increase or decrease the bending flexibility of channel 10.

The present invention includes a vehicle glass run channel providing an improved bending flexibility allowing the glass run channel to traverse curves in a window aperture while providing a desirable appearance between the glass run channel and the vehicle surface surrounding the window aperture. Also, the present invention provides enhanced versatility in coordinating the exterior surface of the glass run channel with the exterior color pattern of the vehicle to which it is attached.

The foregoing discussion discloses and describes exemplary embodiments of the present invention. One skilled in the art will readily recognize from such discussion, and from the accompanying drawings and claims, that various changes, modifications, and variations can be made therein. For example, glass run channel 10 can be provided entirely of the form of FIG. 2 or alternatively of that of FIG. 4, depending upon the particular application and desired strength and bendability. Therefore, it is intended that such variations and modifications are within the true spirit and fair scope of the invention as defined in the following claims.

What is claimed is:

1. A glass run channel assembly for a translationally movable pane in a vehicle window aperture, the glass run channel assembly having:

an elastomeric extrusion having a generally U-shaped cross section defining a glass run channel and having a pair of legs having edges joined by a base web; and a reinforcement comprising:
a metal core extending substantially within one of said legs and said base web; and
a thermoplastic polymeric structural member bonded to said elastomeric extrusion and providing structural support for the other of said legs.

2. The glass run channel assembly of claim 1 wherein said polymeric structural member has an L-shaped cross-section with a leg extending in a plane generally parallel to and overlapping said metal core of said base web.

3. The glass run channel assembly of claim 1 including an additional thermoplastic polymeric structural member which is an angle bracket in said glass run channel.

4. The glass run channel assembly of claim 1 wherein said polymeric structural member is on an outer portion of said other leg to thereby present an appearance surface.

5. The glass run channel assembly of claim 4 wherein said polymeric structural member is thermo-bonded to said elastomeric extrusion by extrusion thereon.

6. The glass run channel of claim 5 wherein the polymeric material is polyethylene.

7. The glass run channel assembly of claim 4 wherein said polymeric structural member includes a selected pigment composition to color match an adjacent surface.

* * * * *